(12) United States Patent
Karatkevich et al.

(10) Patent No.: US 11,307,974 B2
(45) Date of Patent: Apr. 19, 2022

(54) HORIZONTALLY SCALABLE DISTRIBUTED SYSTEM FOR AUTOMATED FIRMWARE TESTING AND METHOD THEREOF

(71) Applicant: SK hynix Inc., Gyeonggi-do (KR)

(72) Inventors: Aleh Karatkevich, Minsk (BY); Kiryl Smalouski, Minsk (BY); Farhad Jabiyev, Minsk (BY); Raman Piatrovich, Minsk (BY); Uladzislau Savik, Minsk (BY); Mikalai Zialenkin, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/012,923

(22) Filed: Sep. 4, 2020

(65) Prior Publication Data

US 2022/0075711 A1  Mar. 10, 2022

(51) Int. Cl.
*G06F 11/36* (2006.01)
*H04L 29/08* (2006.01)
*G06F 11/32* (2006.01)
*G06F 9/54* (2006.01)
*H04L 67/02* (2022.01)

(52) U.S. Cl.
CPC .......... *G06F 11/3688* (2013.01); *G06F 9/546* (2013.01); *G06F 9/547* (2013.01); *G06F 11/328* (2013.01); *G06F 11/3676* (2013.01); *G06F 11/3684* (2013.01); *G06F 11/3692* (2013.01); *H04L 67/02* (2013.01)

(58) Field of Classification Search
CPC .............. G06F 11/3688; G06F 11/328; G06F 11/3676; G06F 11/3684; G06F 11/3692; G06F 9/546; H04L 67/02

USPC .................................................. 717/124–132
See application file for complete search history.

(56) References Cited

U.S. PATENT DOCUMENTS

| | | | | |
|---|---|---|---|---|
| 5,319,645 A | * | 6/1994 | Bassi | G06F 11/3664 714/38.13 |
| 6,014,760 A | | 1/2000 | Silva et al. | |
| 6,163,805 A | | 12/2000 | Silva et al. | |
| 6,324,683 B1 | * | 11/2001 | Fuh | G06F 11/362 714/E11.21 |
| 6,477,666 B1 | * | 11/2002 | Sanchez | G06F 11/3688 714/38.12 |

(Continued)

OTHER PUBLICATIONS

Ahn et al, "Automated Firmware Testing using Firmware-Hardware Interaction Patterns", ACM, pp. 1-10 (Year: 2014).*

(Continued)

*Primary Examiner* — Anil Khatri
(74) *Attorney, Agent, or Firm* — IP & T Group LLP

(57) ABSTRACT

A system and method for automated firmware testing. The system includes test stations for testing firmware products. The stations split into pools, with each pool including multiple test stations. The system also includes multiple execution instances, each execution instance for executing tests corresponding to the associated pool. Each of competing test stations delivers a test start event to a corresponding execution instance. The corresponding execution instance receives test start events from the competing test stations, and executes a run test command on a select test station among the competing test stations such that the select test station performs test execution based on a test sequence.

18 Claims, 7 Drawing Sheets

(56) References Cited

U.S. PATENT DOCUMENTS

| | | | |
|---|---|---|---|
| 6,701,460 B1* | 3/2004 | Suwandi | G06F 11/2215 |
| | | | 714/38.1 |
| 6,754,895 B1* | 6/2004 | Bartel | H04M 1/72406 |
| | | | 717/171 |
| 6,907,546 B1* | 6/2005 | Haswell | G06F 11/3684 |
| | | | 714/38.11 |
| 7,516,443 B2* | 4/2009 | Creamer | G06F 11/3688 |
| | | | 709/201 |
| 7,823,135 B2* | 10/2010 | Horning | G06F 21/14 |
| | | | 717/127 |
| 7,987,397 B2 | 7/2011 | Yang | |
| 8,271,949 B2* | 9/2012 | Bernardini | G06F 11/366 |
| | | | 717/124 |
| 8,418,000 B1* | 4/2013 | Salame | H04L 67/10 |
| | | | 714/38.1 |
| 8,489,474 B2* | 7/2013 | Crook | G06Q 10/04 |
| | | | 705/35 |
| 8,739,126 B2* | 5/2014 | Glaser | G06F 11/3664 |
| | | | 717/124 |
| 8,874,598 B2* | 10/2014 | Spengler | G06F 11/3692 |
| | | | 707/758 |
| 8,984,486 B2* | 3/2015 | Nayak | G06F 11/368 |
| | | | 717/124 |
| 9,146,837 B2* | 9/2015 | Jamison | G06F 8/63 |
| 9,310,437 B2 | 4/2016 | Chen et al. | |
| 9,424,171 B1 | 8/2016 | Chirgwin et al. | |
| 9,652,364 B1* | 5/2017 | Kaila | G06F 11/3688 |
| 9,721,086 B2* | 8/2017 | Shear | G06F 21/53 |
| 9,727,361 B2 | 8/2017 | Anand et al. | |
| 10,684,940 B1* | 6/2020 | Kayal | G06F 11/3664 |
| 2003/0051188 A1 | 3/2003 | Patil | |
| 2006/0066293 A1 | 3/2006 | Gopal et al. | |
| 2007/0132477 A1 | 6/2007 | Balog et al. | |
| 2012/0185832 A1 | 7/2012 | Rossi et al. | |
| 2015/0082090 A1 | 3/2015 | Holden | |
| 2017/0046510 A1 | 2/2017 | Chen et al. | |
| 2018/0018680 A1 | 1/2018 | BS et al. | |
| 2019/0317886 A1 | 10/2019 | Smith et al. | |
| 2020/0050493 A1 | 2/2020 | Milojicic et al. | |
| 2021/0293664 A1 | 9/2021 | Bayarovich et al. | |

OTHER PUBLICATIONS

Thoss et al, "A Framework-Based Approach for Automated Testing of CNC Firmware", ACM, pp. 7-12 (Year: 2014).*

Srivastva et al, "FirmFuzz: Automated IoT Firmware Introspection and Analysis", ACM, pp. 15-21 (Year: 2019).*

Fedasyuk et al., "Architecture of a Tool for Automated Testing the Worst-Case Execution Time of Real-Time Embedded Systems � � Firmware", IEEE, pp. 278-281 (Year: 2017).*

Snyder et al, "The Realities of Testing Meter Firmware Upgradeability", IEEE, pp. 1-5 (Year: 2014).*

Finkelman, "Combining Visual TEST with ICE for Embedded System Testing", IEEE, p. 160-161 (Year: 1996).*

Berg, "Firmware testing and test data selection", ACM-National Computer Conference, pp. 75-80 (Year: 1981).*

Benz, "Combining Test Case Generation for Component and Integration Testing", ACM, pp. 23-33 (Year: 2007).*

Office Action issued by the USPTO for U.S. Appl. No. 16/825,721 dated May 27, 2021.

Notice of Allowance issued by the USPTO dated Nov. 16, 2021.

\* cited by examiner

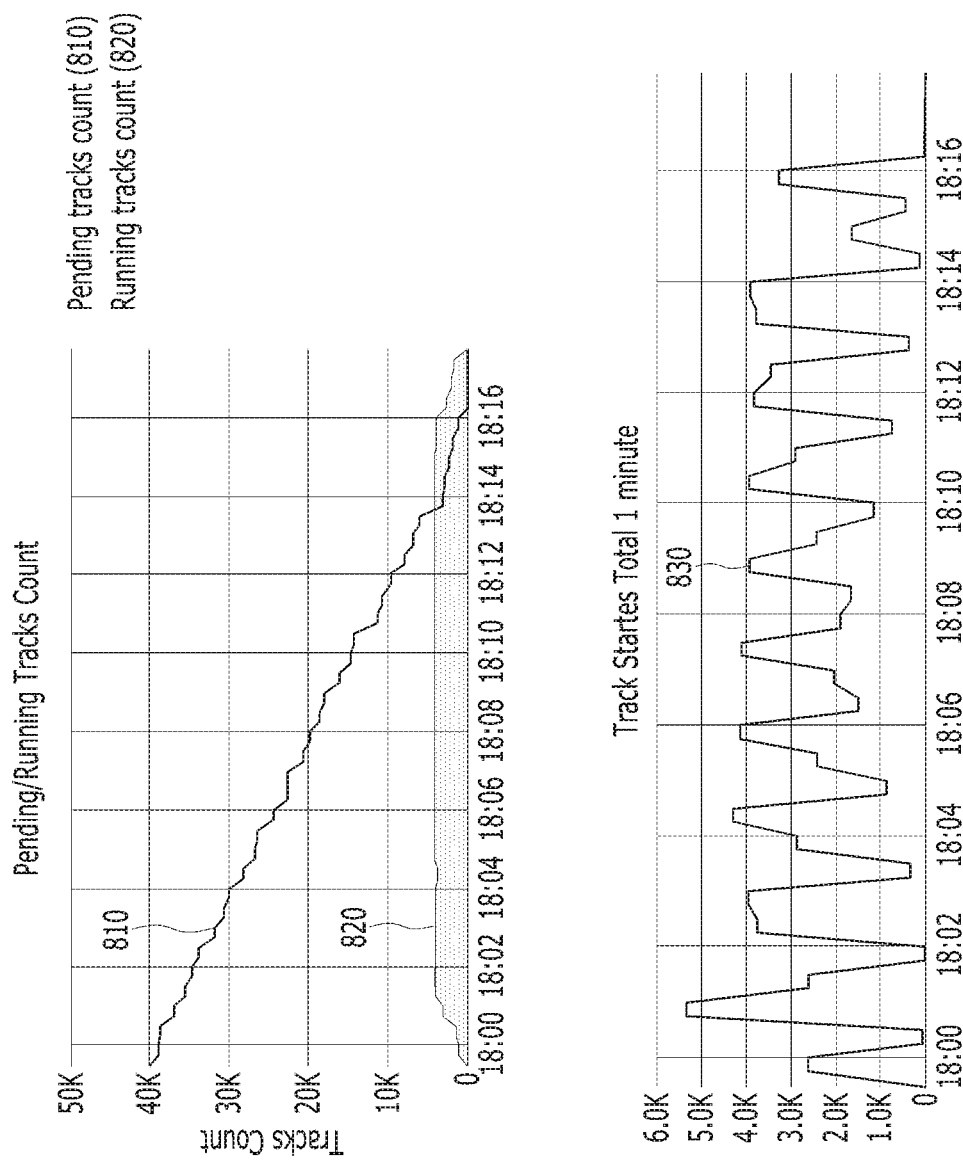

HORIZONTALLY SCALABLE DISTRIBUTED SYSTEM FOR AUTOMATED FIRMWARE TESTING AND METHOD THEREOF

BACKGROUND

1. Field

Embodiments of the present disclosure relate to a scheme for testing firmware of electronic devices.

2. Description of the Related Art

Electronic devices are widely used in a variety of forms. Examples of larger electronic devices include a desktop computer, a workstation, a three-dimensional (3D) television, a smart television, a digital audio recorder, a digital audio player, a digital picture recorder, a digital picture player, and/or a digital video recorder and a digital video player. Various portable electronic devices are also available, such as a mobile phone, a smart phone, an e-book, an MP3 player, a portable multimedia player (PMP), and a portable game player.

An electronic device may be implemented with various components including a memory system (or storage device), which includes hardware (HW) and software (SW). Examples of memory systems include a hard disk drive (HDD), a solid state drive (SSD), a universal serial bus (USB) memory device, and a memory card such as a secure digital (SD) card and a universal flash storage (UFS). Components of electronic devices may need to be tested. In this context, embodiments of the present invention arise.

SUMMARY

Aspects of the present invention include a system with horizontally scalable distributed architecture for automated firmware testing and a method thereof.

In one aspect, a system includes: a plurality of test stations for testing a plurality of firmware products, which stations are split into multiple pools, each pool including multiple test stations; and multiple execution instances, each execution instance for executing tests corresponding to the associated pool. Each of competing test stations among the multiple test stations delivers a test start event to a corresponding execution instance. The corresponding execution instance receives test start events from the competing test stations, and executes a run test command on a select test station among the competing test stations such that the select test station performs test execution based on a test sequence.

In another aspect, a method for operating a test system includes: splitting a plurality of test stations for testing a plurality of firmware products into multiple pools, each pool including multiple test stations; delivering, by each of competing test stations among the multiple test stations, a test start event to a corresponding execution instance among multiple execution instances, each execution instance for executing tests corresponding to the associated pool; receiving, by the corresponding execution instance, test start events from the competing test stations; and executing, by the corresponding execution instance, a run test command on a select test station among the competing test stations such that the select test station performs test execution based on a test sequence.

Additional aspects of the present invention will become apparent from the following description.

BRIEF DESCRIPTION OF THE DRAWINGS

FIG. 8 is a diagram illustrating performance of a test system in accordance with an embodiment of the present invention.

DETAILED DESCRIPTION

Figure 1:
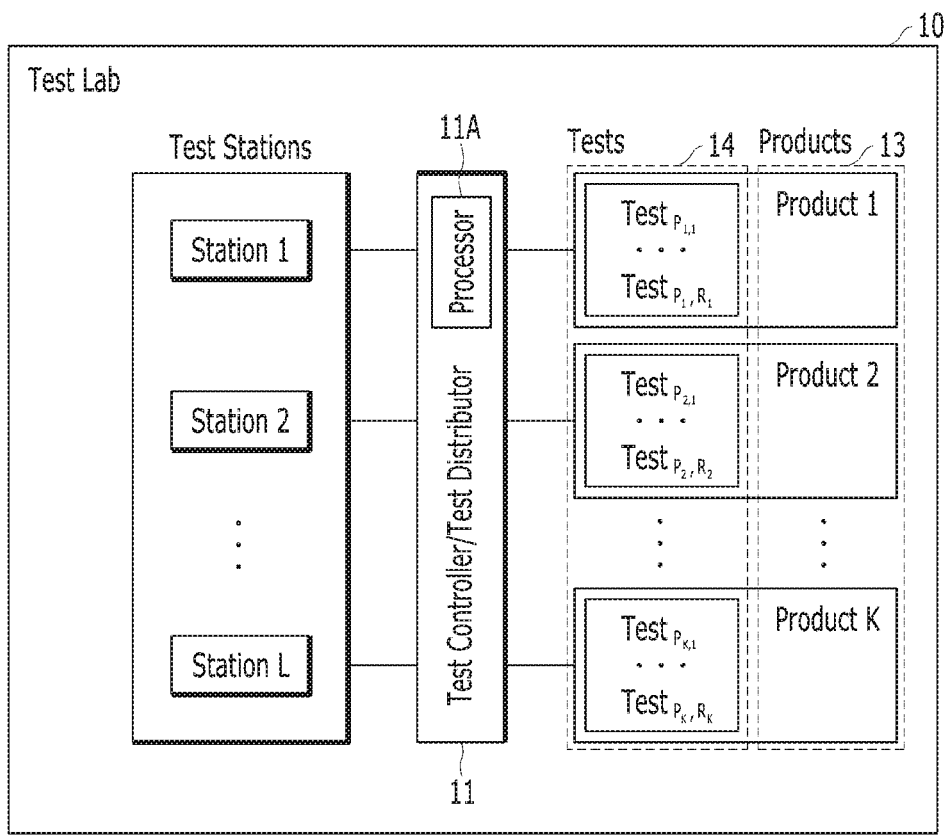
FIG. 1 is a schematic diagram illustrating a testing lab in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

Components (or products) of electronic devices are required to be tested. In particular, software (or firmware) products of electronic devices are required to be tested. Firmware is a specific class of computer software that provides the low-level control for a device's specific hardware. Typical examples of electronic devices containing firmware are embedded systems, consumer appliances, computers, computer peripherals, and memory systems (or storage devices). Firmware may be held in non-volatile memory devices such as a read only memory (ROM), an electrically programmable read only memory (EPROM), or a flash memory.

Automated software (or firmware) testing requires the simultaneous running of significant amounts of tests. A test station or machine in an isolated environment is used to execute a separate limited sequence of tests. An increase in the number of simultaneously executed tests leads to an increase in the number of test stations as shown in FIG. 1.

Referring to FIG. 1, a testing lab 10 comprises a test controller or distributor 11 and L testing stations (or machines), individually and collectively identified by 12, and K products to be tested, individually and collectively identified by 13. $R_i$ tests 14 are to be run on L stations for testing K products, where i=1, . . . , K. The test distributor 11 may include a processor 11A for controlling tests on K products. By way of example, the testing lab 10 may test firmware of components or products (i.e., firmware products) embedded in electronic devices such as memory systems (or storage devices).

In the test lab 10, orchestration of test stations 12 and processing tests 14 results a heavy computation load. This computation load cannot be handled by only vertical scaling of the test lab 10. Usually, there are many more tests to be executed than there are test stations available for execution. This raises another issue: a high level of concurrency during the distribution of test stations. Accordingly, a test system in accordance with embodiments may provide an architecture, which allows applying horizontal scaling to the task of a mass execution of automation tests and handling high concurrency between tests for the test stations.

Figure 2:
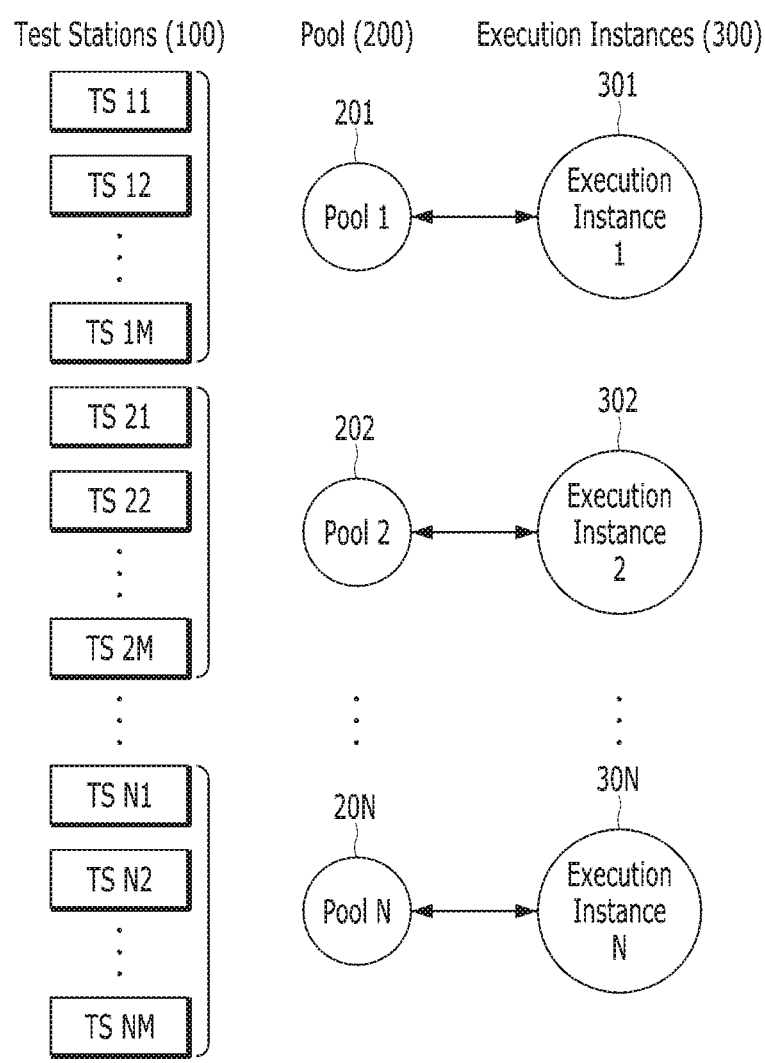
FIG. 2 is a diagram illustrating a plurality of stations divided into pools in accordance with an embodiment of the present invention.

In order to manage a large number of test stations, embodiments may split (or group) the multiple machines into pools and connect each pool to a separate subset of system components: an independent execution instance. In the illustrated embodiment of FIG. 2, a test system may include a plurality of test stations 100 for testing a plurality of products. For example, the products may include embedded firmware, i.e., firmware products. The plurality of test stations 100 may be split into multiple pools 200. For example, a first pool 201 includes multiple (e.g., M) test stations TS11 to TS1M, a second pool 202 includes M test stations TS21 to TS2M and a Nth pool 20N includes M test stations TSN1 to TSNM. Although FIG. 2 illustrates that each pool has the same number of test stations, the number of test station in each pool may be different. In some embodiments, the test stations are grouped according to set characteristics of products to be tested (e.g., firmware products of memory systems): the hardware used in a memory system, an operating system used in the memory system, the amount of available memory (e.g., RAM) and/or memory device (e.g., HDD) in the memory system.

Further, the test system may include multiple execution instances 300. Each execution instance may execute tests on the test stations in the corresponding pool. For example, a first execution instance 301 executes tests on test stations of the first pool 201, a second execution instance 302 executes tests on test stations of the second pool 202 and a Nth execution instance 30N executes tests on test stations of the Nth pool 20N. An execution instance may be a separate environment with a number of components responsible for the full test execution process. Each execution instance may manage a pool of test stations. A set of tests to be executed has a relation to the test stations in a particular pool.

In accordance with the structure of FIG. 2, embodiments may achieve horizontal scaling by increasing the number of independent execution instances. Further, embodiments provide a solution to the high-concurrency issue by reversing the distribution flow between test stations and tests. In other words, embodiments implement a scheme where test stations compete for tests, instead of tests competing for test stations. This scheme may significantly decrease concurrency (i.e., simultaneous execution) because the number of test stations is always much less than the number of tests. The structure and scheme for the test system in FIG. 2 are described with reference to FIGS. 3 to 7.

Figure 3:
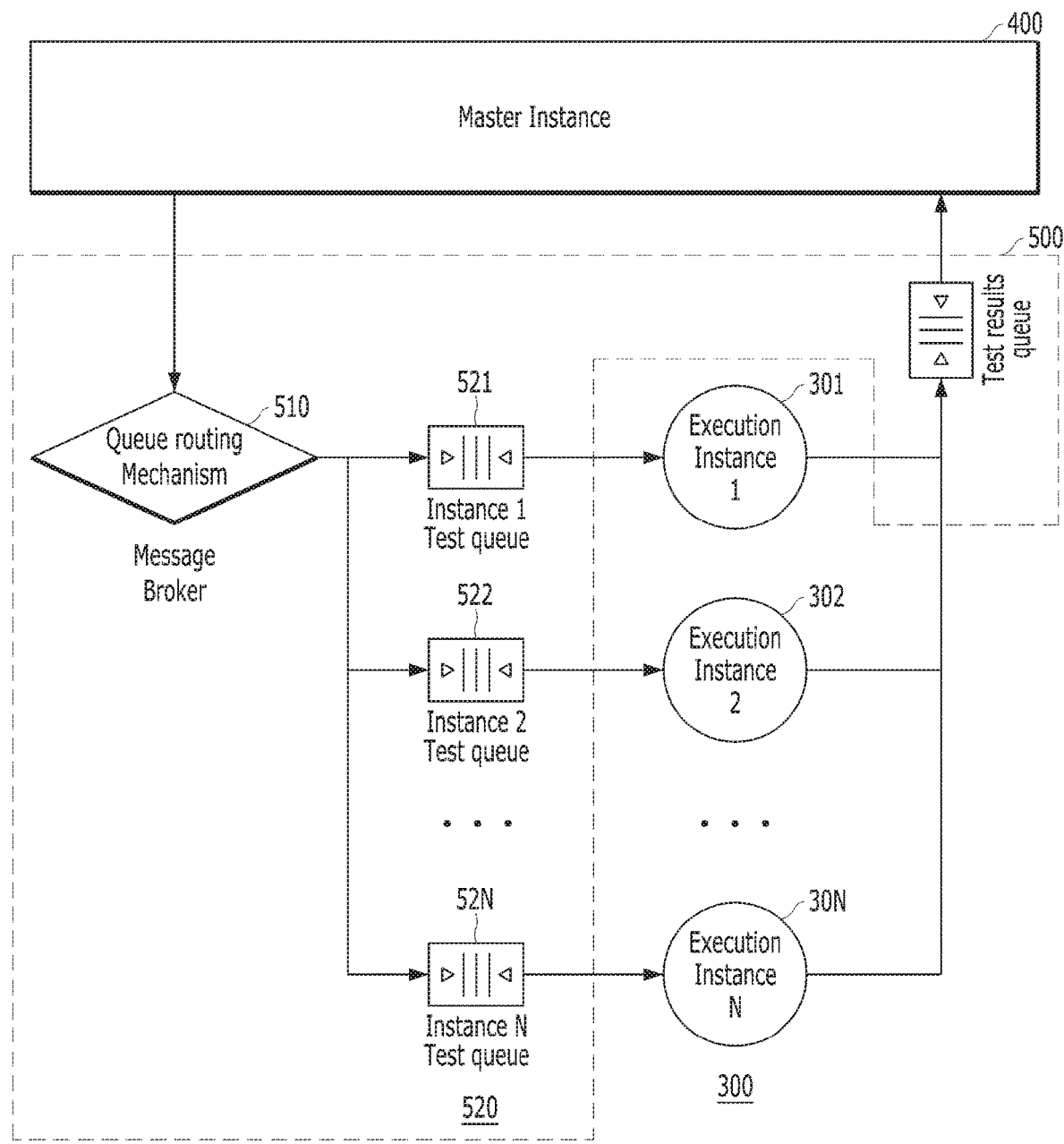
FIG. 3 is a diagram illustrating a mechanism by which execution instances are scaled in accordance with an embodiment of the present invention.

FIG. 3 is a diagram illustrating a mechanism by which execution instances are scaled in accordance with an embodiment of the present invention.

Referring to FIG. 3, multiple execution instances 300 may include N execution instances 301 to 30N (where N is the number of execution instances) in parallel and be coupled to a master (or main) instance 400. N execution instances 301 to 30N and the master instance 400 may be components of the test controller 11 in FIG. which are responsible for test execution process. Further, the master instance 400 may include a user interface, which is coupled to the test controller 11 and interface between the test controller 11 and a user. To launch tests, the master instance 400 may send messages associated with the tests to a messaging system 500.

The messaging system 500 may organize the communication between the master instance 400 and the execution instances 301 to 30N. The messaging system 500 may include a message broker 510, instance test queues 520 and a test result queue 530. The message broker 510 may use a set queue routing mechanism to put messages associated with tests from the master interface 400 into the appropriate instance test queues 520. The instance test queues 520 may include instance test queues 521 to 52N, which correspond to the execution instances 301 to 30N, respectively. For example, the message broker 510 may put messages associated with tests of the execution instance 301 into the instance test queue 521.

Each of the execution instances 301 to 30N may independently obtain messages from its own queue and process tests based on the messages. After completing tests, each of the execution instances 301 to 30N may put test results into the corresponding outgoing test result queue 530.

Figure 4:
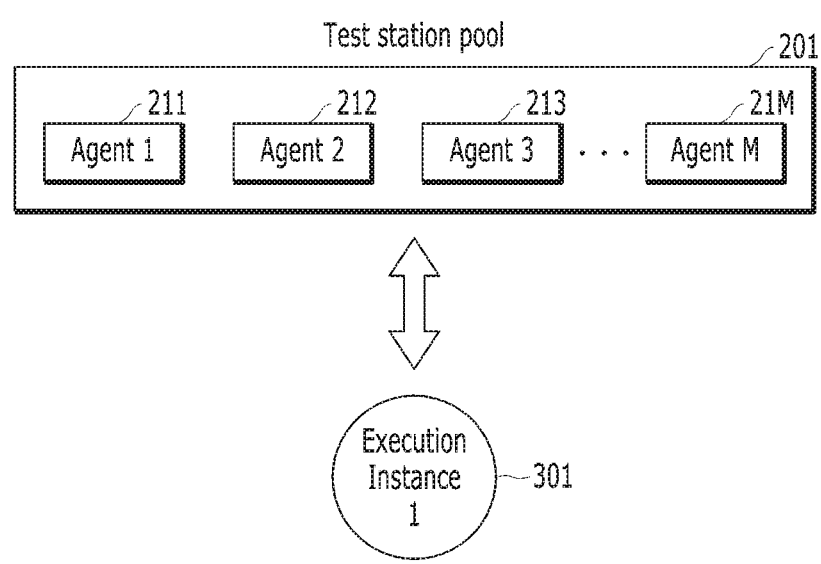
FIG. 4 is a diagram illustrating communication between a test station pool and an execution instance in accordance with an embodiment of the present invention.

FIG. 4 is a diagram illustrating communication between a test station pool 201 and a first execution instance 301 in accordance with an embodiment of the present invention.

Referring to FIG. 4, the test station pool 201 may include multiple test stations and each test station may include an agent, which is a special system software launched on it. In other words, the test station pool 201 may include multiple agents 211-21M. Each agent is responsible for the execution of remote commands on the corresponding test station. The first execution instance 301 may be coupled to the multiple agents 211 to 21M via a set interface, e.g., a remote procedure call (RPC) protocol.

The multiple agents 211 to 21M may compete for access to the first execution instance 301. In other words, multiple test stations corresponding to the multiple agents 211 to 21M may compete for tests by delivering test requests (i.e., test start events) to the first execution instance 301. When test start events are received from the competing multiple test stations, the first execution instance 301 may select a test start event among the competing test start events for test execution. In some embodiments, the first execution instance 301 may select the test start event, which is first received and stored in a queue (e.g., an idle queue of FIG. 6), among the competing test start events.

Figure 5:
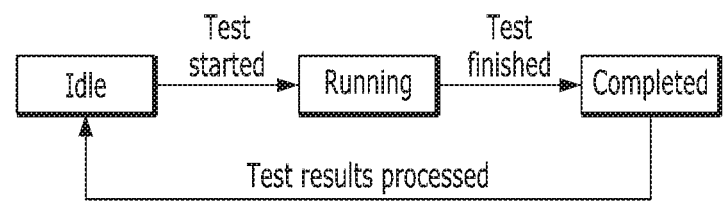
FIG. 5 is a diagram illustrating states of an agent in accordance with an embodiment of the present invention.

FIG. 5 is a diagram illustrating states of an agent in accordance with an embodiment of the present invention.

Referring to FIG. 5, an agent may be in one of multiple states: "Idle," "Running" and "Completed" in life cycle of the corresponding test station. State "Idle" represents that the test station is not busy and is ready to start the execution of some tests sequence. State "Running" represents that the test station is executing tests. State "Completed" represents that the test station has finished execution of tests and is ready to provide the result of tests.

Figure 6:
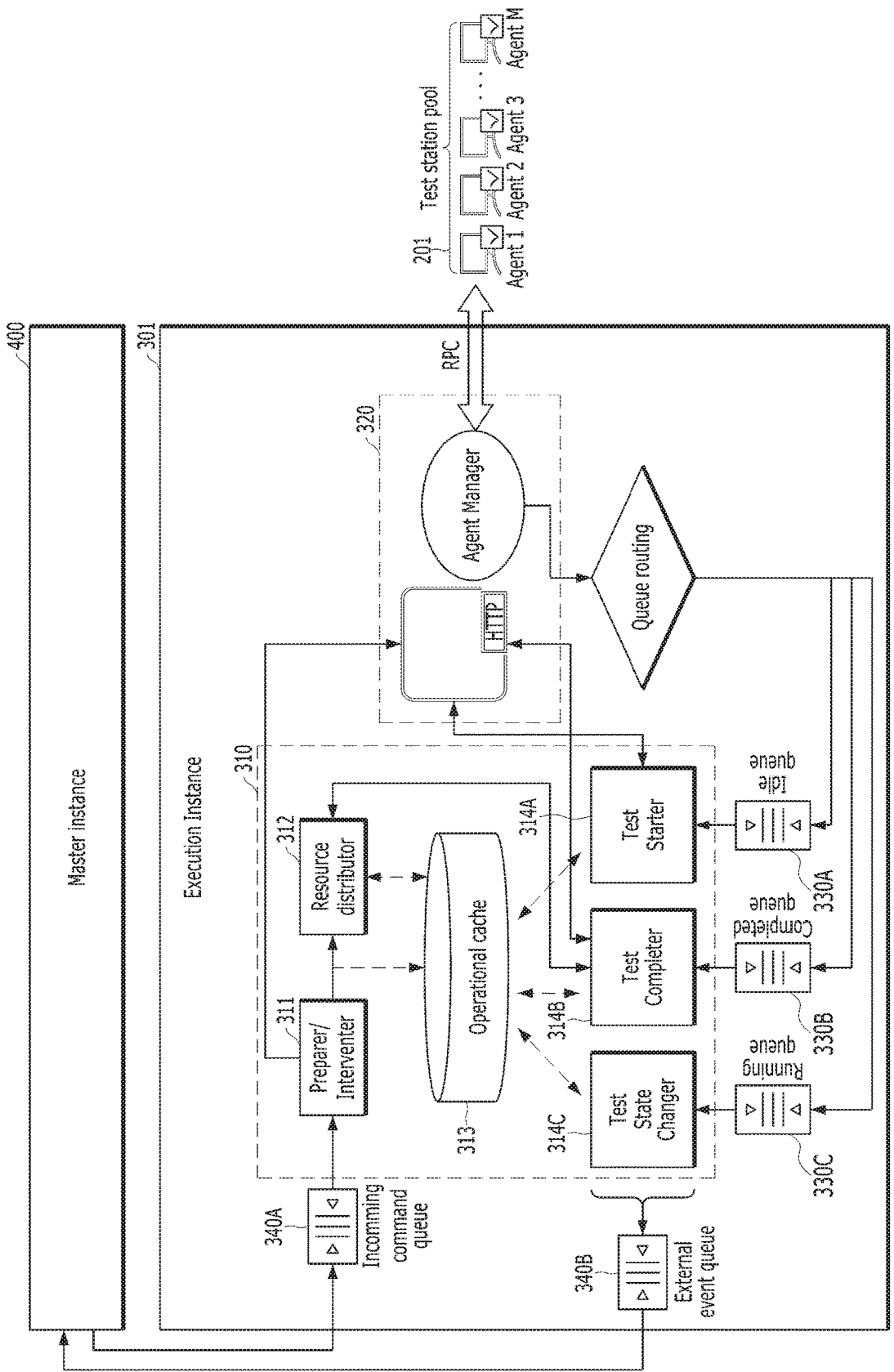
FIG. 6 is a diagram illustrating a structure of an execution instance in accordance with an embodiment of the present invention.

FIG. 6 is a diagram illustrating a structure of an execution instance 301 in accordance with an embodiment of the present invention. Each of the remaining execution instances 302-30N may have the same structure.

Referring to FIG. 6, the execution instance 301 may be coupled to the master instance 400 as shown in FIG. 3, and may be coupled to the test station pool 201 as shown in FIG. 4. The test station pool 201 may include test stations with launched agents 211-21M therein. Each agent may be connected to the execution instance 301. As each agent changes state that event may be reported to the execution instance 301.

The execution instance 301 may include a test engine 310, an agent manager 320, state queues 330A-330C, an incoming command queue 340A and an external event queue 340B. The incoming command queue 340A may correspond to the instance test queue 521 of FIG. 3 and the external event queue 340B may correspond to the outgoing test result queue 530 of FIG. 3.

The agent manager 320 may communicate with the agents 201 via a set protocol (e.g., the RPC protocol) and may act as a proxy link, which processes events from the test stations of the test station pool 201 and transforms these events into messages in separate queues 330A-330C depending on the type of the events from the agents 201. The agents 201 may produce three types of events corresponding to the state of each agent: Idle, Running, and Completed. In addition, the agent manager 320 may provide a set interface, e.g., a hypertext transfer protocol (HTTP) interface to other components of the execution instance 301. Via the HTTP interface, it is possible to obtain information about a single test station and execute commands on it.

In some embodiments, there are various logical units inside the test engine 310, which are described in below. Events of the agents 201 may be obtained by separate parts of the test engine 310.

The test engine 310 may include a preparer (or intervener) 311, a resource distributor 312, an operational cache 313, a test starter 314A, a test completer 314B and a test state changer 314C. The operational cache 313 may be persistent storage, which stores data about the running test sequence. For example, the data about the running test sequence includes a sequence of tests to be run, status of agents (e.g., which agent is running) and meta information associated with tests.

The preparer/intervener 311 may receive command messages about starting/stopping sequences of tests from the master instance 400 through the incoming command queue 340A. In other words, the preparer/intervener 311 may consume the command messages on the incoming command queue 340A and process these commands. The preparer/intervener 311 may convert and save the test sequence in the operational cache 313 and prepare files with artifacts, which is required for running tests on test stations. An artifact represents an item involved in the process of automated testing (for example, an exact firmware build to be tested, a package with test framework, an executable test itself, etc.). The resource distributor 312 may dynamically allocate resources to test stations. In some embodiments, the resource distributor 312 may allocate resources to test stations based on priorities of test stations. One implementation of priority-based dynamic resource allocation is described in U.S. patent application Ser. No. 16/825,721, entitled "PRIORITY-BASED DYNAMIC RESOURCE ALLOCATION FOR PRODUCT TESTING", the content of which is incorporated by reference herein.

The test starter 314A may react to the idle event from test stations of the test station pool 201, which is stored in the idle queue 330A. The test starter 314A may select a test that will be launched at the exact station (signaling that it is free) and forming a command to launch this test. The test state changer 314C may update test statuses in the operational cache 313. The test completer 314B may react to the completed event from test stations of the test station pool 201. The test completer 314B may grab test logs from the test stations, analyze and transform the test logs, and provide information regarding the test logs as a test result to the master instance 400 through the external event queue 340B.

As described above, multiple test stations, each corresponding to M multiple agents in the associated test station pool 201 may compete for tests by delivering test requests (i.e., test start events) to the execution instance 301. When test start events are received from the competing multiple test stations, the execution instance 301 may select a test start event among the competing test start events for test execution. In some embodiments, the execution instance 301 may select the test start event, which is first received and stored in the idle queue 330A, among the competing test start events.

Figure 7:
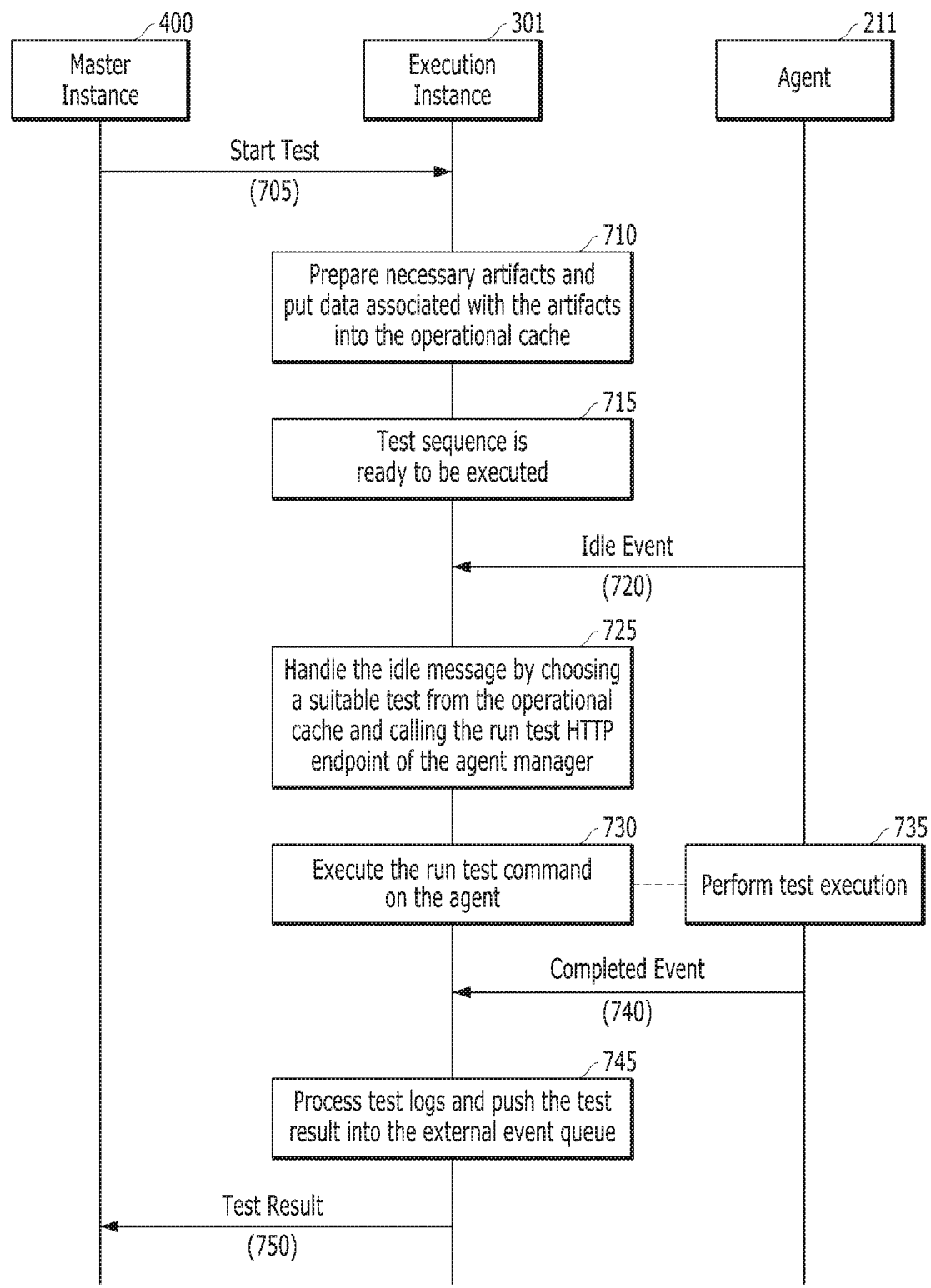
FIG. 7 is a diagram illustrating a test execution process in accordance with an embodiment of the present invention.

FIG. 7 is a diagram illustrating a test execution process in accordance with an embodiment of the present invention. By way of example and not limitation, the test execution process may be performed between the agent 211 and the execution instance 301 and in FIG. 6. The same test execution process may be performed between other agents and the execution instance 301.

Referring to FIG. 7, the test execution process is triggered by a test campaign. In some embodiments, the test campaign is generated by an end user via the user interface as part of the master instance 400. In response to the test campaign, the master instance 400 may put a command to start a test sequence in the incoming command queue 340A of the execution instance 301 (operation 705).

The start test sequence command may be handled by the preparer 311. The preparer 311 may prepare necessary artifacts and put data associated with the artifacts into the operational cache 313 (operation 710). After that, the test sequence is ready to be executed (operation 715).

Some test stations in the test station pool 201 may become free. When a test station becomes free, the associated agent 211 delivers an event indicating that such test station is in the idle state (i.e., idle event) to the agent manager 320 via the RPC protocol (operation 720).

The agent manager 320 transforms the idle event into a message (i.e., idle message) in the idle queue 330A. The test starter 314A handles the idle message by choosing a suitable test from the operational cache 313 and calling the run test HTTP endpoint of the agent manager 320 (operation 725).

The agent manager 320 may execute the run test command on the agent 211 via the RPC protocol (operation 730). Under the control of the agent manager 320, the agent 211 may perform test execution (operation 735). As soon as the test is finished, the agent 211 sends a signal to the agent manager 320 indicating that event is completed (operation 740). The agent manager 320 may transform the completed event into a message that is placed in the completed queue 330B. The test completer 3143 may process test logs, which are produced by the test, and push the test result into the external event queue 340B (operation 745). The test result may be provided to the master instance 400 (operation 750).

FIG. 8 is a diagram illustrating performance of a test system in accordance with an embodiment of the present invention.

The test system is a software system prototype, based on the described architecture and implemented with the next tech stack: C#, PYTHON®, .NET CORE™, MS SQL SERVER®, RABBITMQ®, ZEROLEE™, DOCKER™. There are 4000 test stations in the test pool. The regression tests campaign consists of 40,000 tests, and each separate single test duration is up to 90 seconds.

According to the preliminary performance/load testing, a single instance of the test system allows successfully handling 4000 test stations. In this experiment, the test stations were replaced by docker containers connected to a separate single execution instance. As a test load, commands were sent to the incoming queue (i.e., the incoming command queue 340A of FIG. 6) to run tests. Each of the tests was designed to have an upper-limited run time (not more, but, maybe, less than some value). The metrics were collected using a certain monitoring stack such as Prometheus and Grafana. The track is equivalent to the test in the graphical results in FIG. 8. In FIG. 8, performance metrics include pending (not started) tests (i.e., tracks) count 810, running tests (i.e., tracks) count 820 and the number of tests started per minute (i.e., tracks count) 830. It can be seen from the graphical results of FIG. 8 that all tests were distributed, executed, and processed within a certain time (e.g., about 17 minutes from 18:00 to 18:16).

As described above, embodiments provide a scheme for achieving horizontal scaling by increasing the number of independent execution instances. Further, embodiments provide a solution for the high-concurrency issue by using a scheme in which test stations compete for tests, instead of tests competing for test stations. This scheme may significantly decrease concurrency because the number of test stations is always much less than the number of tests.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims

What is claimed is:

1. A system comprising:
a plurality of test stations for testing a plurality of firmware products, which stations are split into multiple pools, each pool including multiple test stations; and
multiple execution instances, each execution instance for executing tests corresponding to an associated pool,
wherein each of competing test stations among the multiple test stations delivers a competing test start event, comprising a request to start testing, to a corresponding execution instance,
wherein the corresponding execution instance receives competing test start events from the competing test stations in the associated pool, and
executes a run test command on a select test station among the competing test stations such that the select test station performs test execution based on a test sequence,
wherein the multiple test stations in each pool compete for tests, and
wherein the plurality of test stations is split into the multiple pools based on set characteristics, wherein the test stations in a given pool have at least one of the set characteristics in common.

2. The system of claim 1, wherein the select test station is a test station which firstly delivered a corresponding test start event to the corresponding execution instance, among the competing test stations.

3. The system of claim 2, wherein the corresponding execution instance includes:
state queues;
an agent manager coupled to the multiple test stations, for storing state information on the multiple test stations in the state queues, based on a state of each of the multiple test stations; and
a test engine for determining the select test station based on the state information, calling the agent manager to execute the run test command on the select test station.

4. The system of claim 3, wherein each of the multiple test stations is in an idle, running or completed state with respect to test execution, and
wherein the state queues include an idle queue, a running queue, and a completed queue for storing idle, running and completed states of each of the multiple test stations, respectively.

5. The system of claim 3, wherein the agent manager is coupled to the multiple test stations through a remote procedure call (RPC) protocol, and is coupled to the test engine through a hypertext transfer protocol (HTTP) interface.

6. The system of claim 1, wherein the corresponding execution instance is ready to be executed in response to a start test sequence command from a user interface.

7. The system of claim 6, wherein the corresponding execution instance receives a test completed event and a test result from the select test station, and provides the user interface with the test result in response to the test completed event.

8. The system of claim 7, wherein the corresponding execution instance includes an incoming queue for storing the start test sequence command, and an external queue for storing the test result.

9. The system of claim 1, wherein the set characteristics include hardware used in a memory system, an operating system used in the memory system, and an amount of available memory and memory device of the memory system.

10. A method for operating a test system comprising:
splitting a plurality of test stations for testing a plurality of firmware products into multiple pools, each pool including multiple test stations;
delivering, by each of competing test stations among the multiple test stations, a competing test start event, comprising a request to start testing, to a corresponding execution instance among multiple execution instances, each execution instance for executing tests corresponding to an associated pool;
receiving, by the corresponding execution instance, competing test start events from the competing test stations in the associated pool; and
executing, by the corresponding execution instance, a run test command on a select test station among the competing test stations such that the select test station performs test execution based on a test sequence,
wherein the multiple test stations in each pool compete for tests, and
wherein the splitting of the plurality of test stations comprises:
splitting the plurality of test stations into the multiple pools based on set characteristics, wherein the test stations in a given pool have at least one of the set characteristics in common.

11. The method of claim 10, wherein the select test station is a test station which firstly delivered a corresponding test start event to the corresponding execution instance, among the competing test stations.

12. The method of claim 11, wherein the corresponding execution instance includes:
state queues;
an agent manager coupled to the multiple test stations, for storing state information on the multiple test stations in the state queues, based on a state of each of the multiple test stations; and
a test engine for determining the select test station based on the state information, calling the agent manager to execute the run test command on the select test station.

13. The method of claim 12, wherein each of the multiple test stations is in an idle, running or completed state with respect to test execution, and
wherein the state queues include an idle queue, a running queue, and a completed queue for storing idle, running and completed states of each of the multiple test stations, respectively.

14. The method of claim 12, wherein the agent manager is coupled to the multiple test stations through a remote procedure call (RPC) protocol, and is coupled to the test engine through a hypertext transfer protocol (HTTP) interface.

15. The method of claim 10, wherein the corresponding execution instance is ready to be executed in response to a start test sequence command from a user interface.

16. The method of claim 15, further comprising:
receiving, by the corresponding execution instance, a test completed event and a test result from the select test station, and providing the user interface with the test result in response to the test completed event.

17. The method of claim 16, wherein the corresponding execution instance includes an incoming queue for storing the start test sequence command, and an external queue for storing the test result.

18. The method of claim 10, wherein the characteristics include hardware used in a memory system, an operating system used in the memory system, and an amount of available memory and memory device of the memory system.

* * * * *